United States Patent
Boskovic et al.

(10) Patent No.: US 7,711,055 B2
(45) Date of Patent: May 4, 2010

(54) SYSTEM AND METHOD FOR SIGNAL ALIGNMENT WHEN COMMUNICATING SIGNALS

(75) Inventors: Boris Boskovic, Toronto (CA); Rostyslav Kyrychynskyi, Toronto (CA)

(73) Assignee: ATI Technologies, Inc., Markham (CA)

( * ) Notice: Subject to any disclaimer, the term of this patent is extended or adjusted under 35 U.S.C. 154(b) by 978 days.

(21) Appl. No.: 11/387,463

(22) Filed: Mar. 23, 2006

(65) Prior Publication Data

US 2007/0223632 A1    Sep. 27, 2007

(51) Int. Cl.
    *H04B 3/00*    (2006.01)
(52) U.S. Cl. ...................................... 375/257
(58) Field of Classification Search ................ 375/257, 375/260, 371; 713/503; 714/700
    See application file for complete search history.

(56) References Cited

U.S. PATENT DOCUMENTS

| | | | | |
|---|---|---|---|---|
| 2004/0160255 A1* | 8/2004 | Ogawa et al. | ............... | 327/263 |
| 2004/0268280 A1* | 12/2004 | Eleyan et al. | ................. | 716/6 |
| 2006/0001103 A1* | 1/2006 | Ghoneima et al. | .......... | 257/368 |
| 2007/0006107 A1* | 1/2007 | Huang et al. | .................. | 716/6 |

* cited by examiner

*Primary Examiner*—Don N Vo
(74) *Attorney, Agent, or Firm*—Courtney Staniford & Gregory LLP

(57) ABSTRACT

A method and system are provided for aligning signals in a communication system. The method and system include alignment logic or functionality configured to compensate for signal propagation discrepancies when communicating signals between one or more other devices. The alignment logic may operate to adjust one or more communicated signals, so that signals that may have different propagation times arrive at one or more devices at a desired time. The system and method may be used when initializing a communication system and before communicating data. The system and method operate to adjust one or more signals, such as a data strobe signal in a memory system for example, so that the one or more signals arrive at one or more devices spaced apart in time within a defined tolerance at a desired time. The alignment logic is used to compensate for signal propagation delays which can be associated with a signal propagation path.

20 Claims, 6 Drawing Sheets

SYSTEM AND METHOD FOR SIGNAL ALIGNMENT WHEN COMMUNICATING SIGNALS

BACKGROUND

As communication devices continue to shrink in size and increase in speed of operation, device manufacturers strive to design smaller, faster chips that consume less power and generate less heat. As the demand for speed and bandwidth increases and the chip size decreases, designers are faced with the difficult task of managing signal integrity. For example, designers try to account for signal propagation issues, such as signal skew, when designing communication devices where multiple signals are communicated across different signal propagation paths. Signal skew may occur when certain operational characteristics of a communication device, such as the length of a signal propagation path, affect the propagation times of one or more signals.

Signal propagation time may also be affected by other device parameters, such as fluctuating temperature, voltage, load, termination, etc. In some instances, manual signal alignment techniques are used to carefully match and balance delays of each signal path of a communication interface when attempting to account for signal propagation discrepancies. Many compensation techniques typically require prior knowledge obtained by simulation or measurement data which can be a time consuming and frustrating process. The simulation or measurement data may be used to approximate signal propagation variations and any associated skew as absolute delay or in terms of number and fractions of clock cycles for example. Designers thus face an onerous and unenviable task since each new design requires simulation and measuring to obtain new signal propagation data.

As described below, some communication interfaces include one or more "fly-by" or "daisy-chained" signals and one or more point-to-point signals (see FIGS. 1 and 2). For example, as shown in the communication interface of FIG. 2, one or more signal paths (DF-R0, DF-R1, DF-R2, etc.) may be described as being daisy-chained from a driver (DF) to multiple receivers (R0-R7), while other signal paths traverse in a point-to-point manner between a driver and particular receivers (D0-R0, D1-R1, D2-R2, etc.). This signal communication interface requires a designer to take into account the various signal propagation paths and other factors when communicating signals across the interface.

As shown in the Table below, signal propagation discrepancies can occur between the daisy-chained signals (DF-R0, DF-R1, DF-R2, etc.) and point-to-point signals (D0-R0, D1-R1, D2-R2, etc.). That is, signals communicated along point-to-point paths may arrive sooner or later than daisy-chained signals, which may result in signal skew. For instance, the distance from daisy-chained driver DF to receivers R0-R7 increases while distances from point-to-point drivers to respective receivers (D0-R0, D1-R1, D2-R2, etc.) change but not in the same amount and order. The Table below illustrates measured distances and delays associated with the topology of FIG. 2. The time column illustrates the time difference associated with signals propagated between (DF-Rx) and (Dx-Rx).

|    | DF-Rx  | Dx-Rx  | Delta (d) | time    |
|----|--------|--------|-----------|---------|
| R0 | 270 mm | 100 mm | 170 mm    | 1.15 ns |
| R1 | 285 mm | 100 mm | 185 mm    | 1.25 ns |
| R2 | 300 mm | 100 mm | 200 mm    | 1.35 ns |
| R3 | 315 mm | 100 mm | 215 mm    | 1.45 ns |
| R4 | 335 mm | 120 mm | 215 mm    | 1.45 ns |
| R5 | 350 mm | 120 mm | 230 mm    | 1.55 ns |
| R6 | 365 mm | 130 mm | 235 mm    | 1.57 ns |
| R7 | 380 mm | 140 mm | 240 mm    | 1.60 ns |

FIG. 4 is a signal timing diagram which illustrates a case of false alignment during a conventional signal alignment process for a double data rate (DDR) type memory system. As shown in FIG. 4, a controlling device attempts a conventional signal alignment process to align a point-to-point signal (PPX0) and a fly-by clock signal (FBCK) as received by the device X. At step 1, the controlling device transmits the point-to-point signal (PPX0) to the device X after transmitting the FBCK. As part of the conventional alignments process, a comparison is made between the leading-edge of the received point-to-point signal (PPX0) and the leading-edge of the received FBCK. Based on the signal alignment protocol, the received signals are aligned when the time difference between the leading-edge of the received point-to-point signal (PPX0) and the leading-edge of the received FBCK are within a defined tolerance (tALGN).

Since the difference between the leading-edge of the received point-to-point signal (PPX0) and the leading-edge of the associated clock are not within the defined tolerance (tALGN) at step 1, at step 2, the controlling device transmits another point-to-point signal (PPX0) (incrementally delayed/advanced in time) and the signals are again compared at device X to determine if signal alignment is achieved. Since the difference between the leading-edge of the received point-to-point signal (PPX0) and the leading-edge of the associated clock are not within the defined tolerance (tALGN) at step 2, at step 3, the controlling device transmits yet another point-to-point signal (PPX0) (incrementally delayed/advanced) and the signals are again compared at device X to determine if signal alignment is achieved.

At step 3, the difference between the leading-edge of the received point-to-point signal (PPX0) and the leading-edge of the associated clock appear to be within the defined tolerance (tALGN), and the device X sends an acknowledging signal (PPX1) to the controlling device, acknowledging that the signals are aligned within the defined tolerance (tALGN). However, since the difference in propagation delay between the fly-by and point-to-point signal is greater than a clock period, the comparison included using the leading edge of an incorrect clock pulse at time 5', resulting in a false alignment. The comparison should have used the leading edge of the clock at time 6'. Thus, the conventional signal alignment process breaks down if the difference in propagation delay between fly-by and point-to-point signal is greater than a clock period, resulting in the false alignment described above, and the subsequent false degree of confidence that communicated signals of the memory system are properly aligned.

DETAILED DESCRIPTION

Embodiments provide a method and system for aligning signals in a communication system. The method and system include alignment logic or functionality configured to compensate for signal propagation discrepancies when communicating signals between one or more other devices. In certain embodiments, the alignment logic may be used during initialization, executed periodically, or at desired times. The alignment logic may operate to adjust one or more communicated signals, so that signals that may have different propagation times arrive at one or more devices, properly aligned and in phase, but is not so limited. For example, when initializing a communication system and before communicating data, the method and system may operate to adjust one or more signals, such as a data strobe signal, so that the one or more signals arrive at one or more devices spaced apart in time within a defined tolerance at the proper time. The alignment logic may be used to compensates for signal propagation delays associated with one or more communicated signals.

In an embodiment, a digital communication method includes communicating a first signal having first signal characteristics including a period over a first signal path. The first signal includes an associated propagation time over the first signal path. The method communicates a second signal having second signal characteristics including a pulse duration that is less than the period of the first signal over a second signal path. The second signal includes an associated propagation time over the second signal path. The method also operates to communicate a third signal having third signal characteristics including an associated pulse duration over a third signal path. The third signal includes an associated propagation time over the third signal path and tracks a correct cycle of the first signal when determining whether certain signals are aligned within a defined tolerance. The method further operates to adjust the propagation time of the second signal over the second communication path until a time difference between the propagation time of the first signal and the propagation time of the second signal is within the defined tolerance and the second signal corresponds with the correct cycle of the first signal as established by the third signal.

Figure 1:
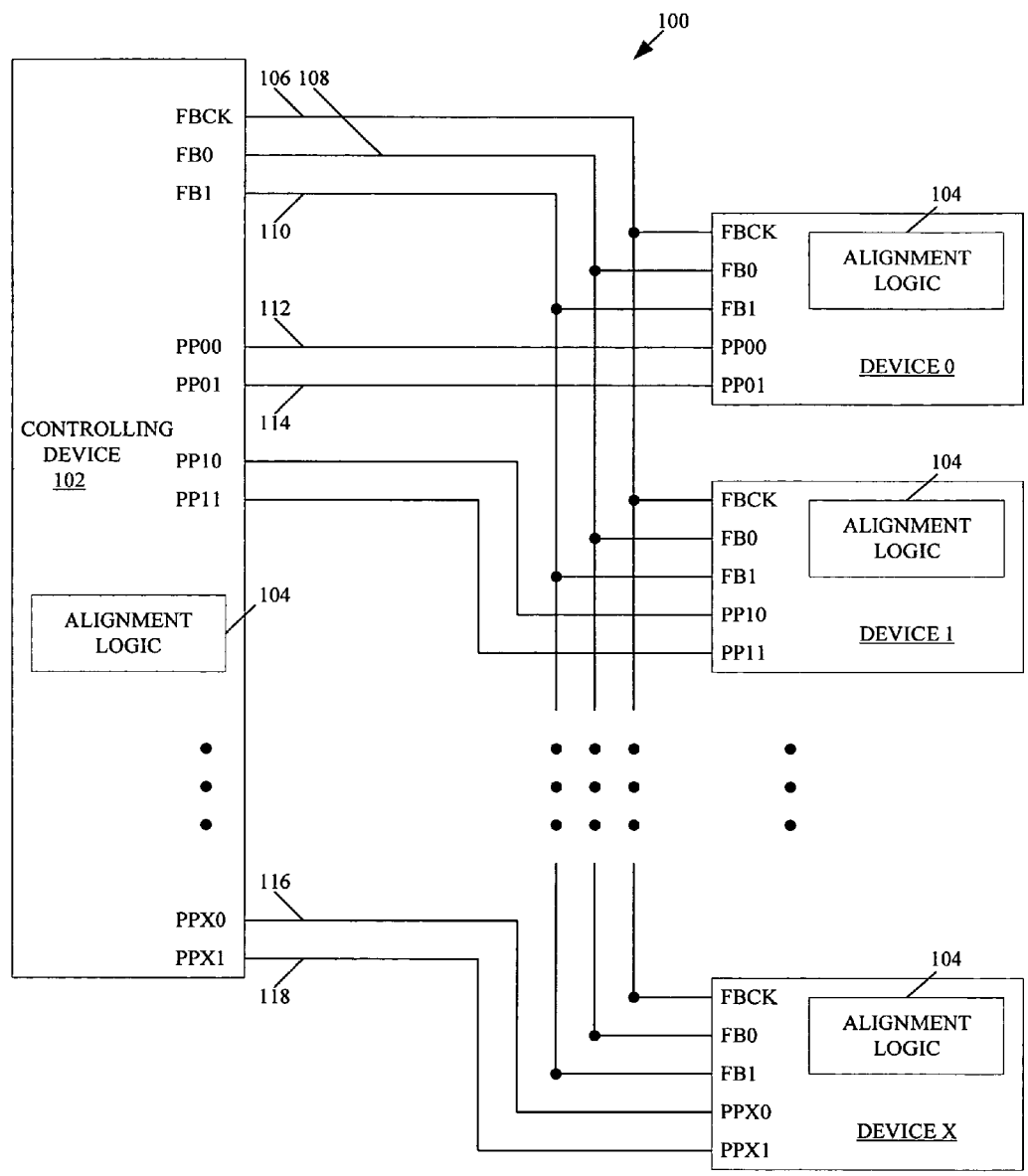
FIG. 1 is a block diagram illustrating components of a communication system including alignment logic, according to an embodiment.

FIG. 1 is a block diagram illustrating components of a communication system 100, according to an embodiment. The communication system 100 includes a controlling device 102, such as a memory controller, driver, processing device, etc. The controlling device 102 is in communication with one or more devices (device 0, ..., device X, where X is an integer) via a number of signal propagation paths. The one or more devices (device 0, ..., device X) are capable of providing one or more output signals to the controlling device 102 based upon one or more signals received by the one or more devices (device 0, ..., device X), but are not so limited.

As described below, the controlling device 102 and/or the one or more devices (device 0, ..., device X) include alignment logic or functionality 104 which, when used, operates to compensate for signal propagation discrepancies that may result when communicating signals between the controlling device 102 and the one or more devices (device 0, ..., device X). The alignment logic 104 operates to adjust one or more communicated signals, so that signals having different propagation times arrive at the one or more devices (device 0, ..., device X) properly aligned and in phase, but is not so limited. For example, when initializing the communication system 100 and before communicating data, it may be useful to adjust one or more signals, so that the one or more signals arrive at the one or more devices (device 0, ..., device X) spaced apart in time within a defined tolerance which occurs in a correct cycle (or interval), as described herein. In alternative embodiments, the alignment logic 104 may be shared between the controlling device 102 and one or more devices (device 0, ..., device X) and vice versa. The alignment logic 104 may be used to align communicated signals between the controlling device 102 and the one or more devices (device 0, ..., device X) simultaneously, consecutively, or in some other manner.

With continuing reference to FIG. 1, a first signal, such as a fly-by clock signal (FBCK), may be communicated over signal propagation path 106 to the one or more devices (device 0, ..., device X). In an embodiment, the controlling device 102 includes functionality for providing the FBCK. Alternatively, the FBCK may be provided to the controlling device 102 by an external clock driver or other source and thereafter communicated by the controlling device 102. A second signal, such as a fly-by signal (FB0), may be communicated over signal propagation path 108 to the one or more devices (device 0, ..., device X). A third signal, such as a fly-by signal (FB1), may be communicated over signal propagation path 110 to the one or more devices (device 0, ..., device X). As described above, signal propagation paths 106, 108, and 110 are sometimes referred to as daisy-chained signal paths as they traverse each of the one or more devices (device 0, ..., device X) in a manner as shown in FIG. 1.

The controlling device 102 is also configured to communicate other signals to the one or more devices (device 0, ..., device X). For example, a fourth signal, such as a point-to-point signal (PP00), may be communicated over signal propagation path 112 to and from the device 0. A fifth signal, such as a point-to-point signal (PP01), may be communicated over signal propagation path 114 to and from the device 0. A sixth signal, such as a point-to-point signal (PPX0), may be communicated over signal propagation path 116 to and from the device X. A seventh signal, such as a point-to-point signal (PPX1), may be communicated over signal propagation path 118 to and from device X. The point-to-point signal propagation paths 112-118 are the result of the direct nature of the communication paths between the controlling device 102 and the one or more devices (device 0, ..., device X). While a certain number of signal propagation paths and associated signals are shown in FIG. 1, the communication system 100 may include fewer or greater numbers of signal propagation paths and is not intended to be limited to any certain embodiments or examples. Additionally, the signal propagation paths may be wireless, optical, wired, or any other communication methodology/technology, including combinations thereof.

As shown in FIG. 1, while the signal propagation paths are not shown to scale, the signal propagation paths 106, 108, and 110 have different propagation lengths and associated signal propagation times as compared to the point-to-point propagation paths 112, 114, 116, and 118. The signal propagation paths 106, 108, and 110 may include substantially similar propagation lengths and associated signal propagation times, according to an embodiment. Thus, in accordance with the various embodiments, the different signal propagation lengths and associated propagation times may be accounted for to provide accurate signal communication when communicating signals between the controlling device 102 and the one or more devices (device 0, . . . , device X). Other factors, such as voltage and temperature fluctuations, load, termination, etc. may also be accounted for when communicated signals using the communication system 100. As described below, the alignment logic 104 may be used in the communication system 100 to compensate for signal propagation delays associated with the communication of one or more signals.

Figure 1A:
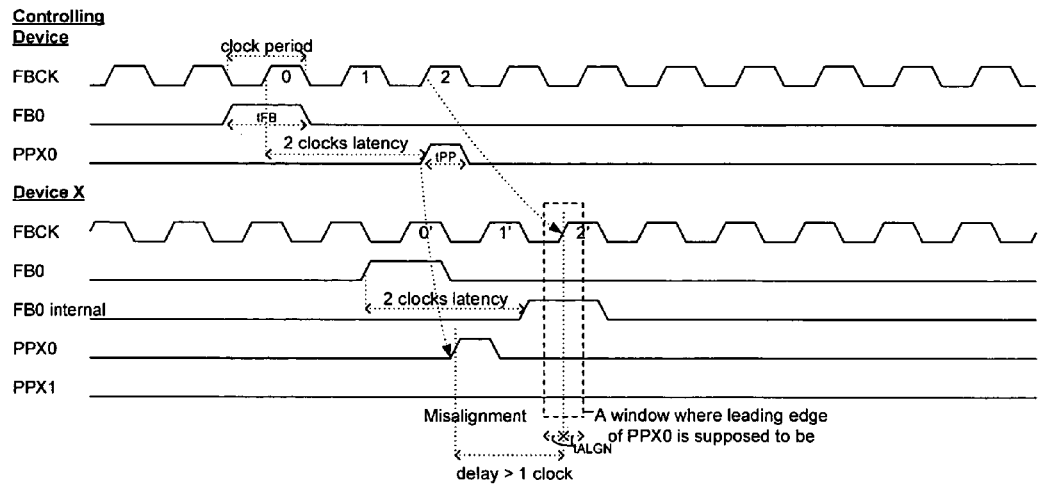
FIGS. 1A-1B are signal timing diagrams which illustrate using signal alignment logic to achieve signal alignment, according to an embodiment.
Figure 1B:
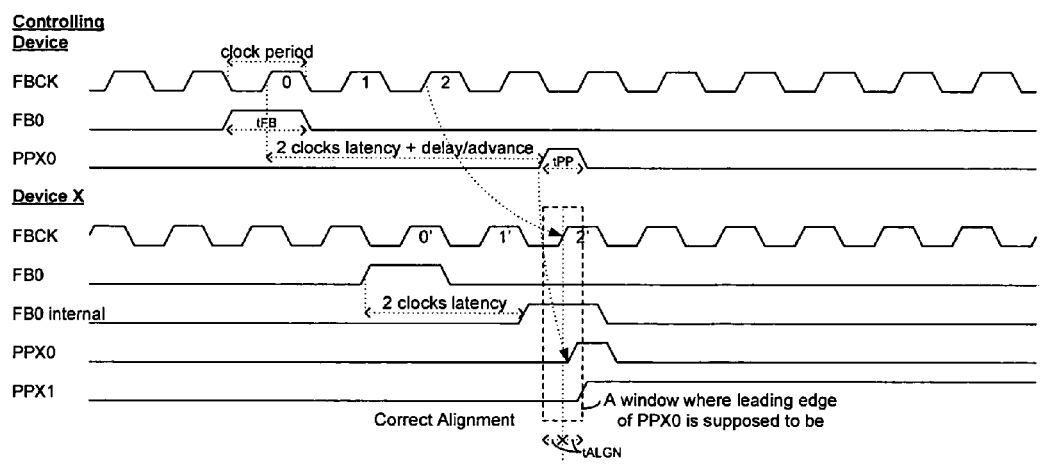

FIGS. 1A-1B are signal timing diagrams which illustrate signals used by the communication system 100 during a signal alignment process, according to an embodiment. The alignment process with respect to device X is discussed to simplify the description. However, the alignment process operates to compensate for signal propagation discrepancies between the controlling device 102 and other devices. As shown in FIG. 1A, during the alignment process, the controlling device 102 communicates a fly-by clock signal (FBCK) having a clock period over signal propagation path 106. The controlling device 102 communicates a fly-by signal (FB0) over signal propagation path 108. The controlling device 102 also communicates a point-to-point signal (PPX0) over signal propagation path 116. Based on certain factors described below, signal alignment occurs when a portion of PPX0 (e.g. a leading edge portion, trailing edge portion, center portion, etc.) is aligned, within a defined tolerance, with a corresponding portion of the FBCK (e.g. a leading edge portion, trailing edge portion, etc.), and the alignment occurs within the proper or correct cycle of the FBCK. While a certain number and type of signals are depicted in FIGS. 1A-1B, the communication system 100 and associated alignment process is not so limited.

As shown in FIGS. 1A-1B, a latency of 2-clock periods is taken into account for certain signals (see the FB0 internal (described below) and PPX0 in FIGS. 1A-1B) used by the controlling device 102 and device X. According to an embodiment, as part of the alignment process, the controlling device 102 informs the device X of an amount of latency (e.g. in terms of the fly-by clock period) to account for during the signal alignment process. Latency refers to a delay between the communication of signals, such as the FBCK and the PPX0, which is generally inherent to a particular system. For example, memory systems generally include an inherent latency in the operation and reaction to commands and clock signals from various sources. As further example, there may be an inherent latency between the time that an external device, such as a processor, makes a request or sends a command for a particular memory operation to a memory system, and the time that the memory system actually reacts to such instructions.

The latency associated with the communication system 100 is determinable and may be based on a number of parameters associated with the operation of the communication system 100. For example, the latency of the communication system 100 may be determined by the amount of time it takes for the controlling device 102 to transmit a second signal, such as PPX0, after transmitting a first signal, such as a FB0. As further example, the latency of the communication system 100 may be determined by the amount of time it takes for the controlling device 102 to transmit a second signal, such as PPX0, after transmitting a first signal, such as a FBCK. In certain embodiments, the communication system 100 may determine a latency of operation before carrying out a signal alignment process. In an embodiment, the latency of operation may be provided to or accessed by the communication system 100 by or from another system or device. Exemplary parameters associated with a system's latency generally include the operating clock speed, operating frequency, etc.

FIG. 1A illustrates the FB0 represented as a signal pulse having a pulse duration (tFB). Under an embodiment, pulse duration (tFB) is about the same as the clock period of FBCK. This pulse duration of the signal pulse represents a logical high state of the FB0. The pulse duration generally refers to an interval between (a) the time, during the first transition, that the pulse amplitude reaches a specified fraction (level) of its final amplitude, and (b) the time the pulse amplitude drops, on the last transition, to the same or a similar level. The PPX0 is represented as a signal pulse including a pulse duration (tPP). Under an embodiment, the pulse duration (tPP) is about the same as half a clock period. The pulse durations of the various signals may be varied and implemented according to a desired communication protocol.

As described above, the communication system 100 uses the alignment logic 104 to achieve signal alignment during the signal alignment process. The communication system 100 achieves signal alignment based on an alignment protocol or other logic which, when satisfied, informs the system or other device that signal alignment is achieved. According to an embodiment, signal alignment is achieved when a portion of a PPX0 (e.g. a leading edge, trailing edge, center, etc.) is aligned, within a defined tolerance, with a portion of the FBCK (e.g. a leading edge, trailing edge, etc.) and the alignment occurs within the proper clock period or interval. Once the signal alignment process is complete, the communication system 100 proceeds with the communication of information, such as the reading and/or writing of data for example, to and from one or more of the devices (device 0, . . . ,device X).

Figure 4:
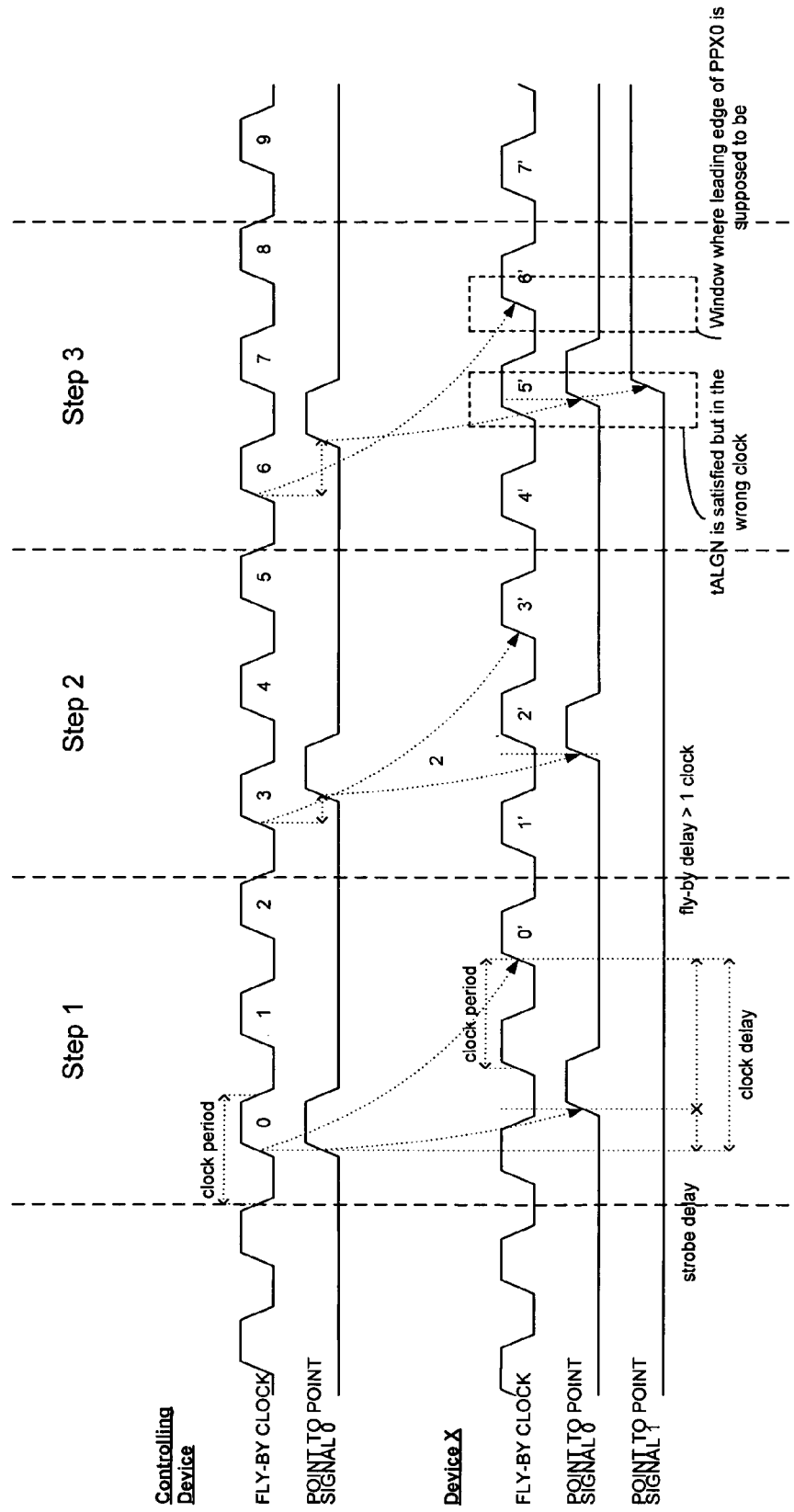
FIG. 4 is a signal timing diagram which illustrates a case of false signal alignment during a conventional signal alignment process.

To simplify the foregoing description of the signal alignment process, the leading edge of the PPX0 and the leading edge of the correct FBCK are referred to when describing how signal alignment is achieved for the communication system 100. As shown in FIG. 1A, at the beginning of the signal alignment process, the controlling device 102 issues an initial PPX0 including a 2-clock latency for example, which attempts to account for any inherent latency of the communication system 100 and/or associated components. As described below, if the delay, such as the delay between one of the daisy-chained signals and one of the point-to-point signals becomes greater than a clock period, the alignment logic 104 may be used to track the correct clock cycle when aligning communicated signals. Thus, as shown in FIG. 1A, the controlling device 102 also transmits the FB0 which keeps track of the correct clock cycle (or interval) for alignment purposes. That is, the controlling device 102 issues a tracking (or gating) signal (here FB0) which tracks the correct clock cycle to be used when comparing the leading edges of the FBCK and PPX0. Otherwise, a false alignment may occur (as described above with respect to FIG. 4).

Still referring to FIG. 1A, the device X receives the FBCK, FB0, and PPX0 at some later time due to the time that it takes for each signal to propagate from the controlling device 102 to the device X. The internal FB0 represents the adjustment of the received FB0 by the alignment logic 104 of the device X, taking into consideration any latency associated with the communication system 100. According to an embodiment, the device X (and other devices) receives the FBCK and FB0 at about the same time due to the substantially similar propagation times of these signals. For example, the signal propagation paths 106 and 108 may be designed to have substantially similar lengths to provide for similar signal propagation times. By substantially matching the propagation times of the FBCK and FB0, the communication system 100 is able to determine when proper alignment of the leading edges of the FBCK and PPX0 occurs within the correct clock cycle as established by the track of FB0.

The dotted rectangles in FIGS. 1A-1B represent a window where the leading edge of the PPX0 should be when determining whether the PPX0 and FBCK are properly aligned, which is based in part on the alignment protocol. As described above, the FB0 ensures that proper alignment occurs between the leading edge of the PPX0 and the leading edge of the correct clock since the FB0 tracks the correct cycle of the FBCK as part of the alignment process. In an embodiment, the window is centered about the leading edge of the correct clock and includes a tolerance or span of about +/− one-quarter of the clock period, but is not so limited. The distance from the leading edge of the correct clock to the leading edge or trailing edge of the window is referred to as tALGN. Based on the alignment protocol, tALGN represents a tolerance that the leading edge of PPX0 should be within when compared to the leading edge of the FBCK to achieve signal alignment. In an embodiment, the device X uses the alignment logic 104 to compare the leading edge of the PPX0 with the leading edge of the FBCK to determine if the separation is within tALGN.

As shown in FIG. 1A, the leading edge of the PPX0 is not within tolerance (+/−tALGN) with respect to the leading edge of the FBCK. Additionally, the leading edge of PPX0 is not within the correct clock cycle as established by the internal FB0 at device X. Since the leading edge of PPX0 is not within tALGN with respect to the correct clock cycle, the communication system 100 continues using the alignment logic 104 to achieve signal alignment. FIG. 1B illustrates a later point in time when the controlling device 102 transmits a subsequent PPX0 delayed or advanced in time with respect to a prior PPX0 transmission. The controlling device 102 may have to adjust the PPX0 a number of times before achieving signal alignment for the communication system 100. The delay or advancement of the PPX0 by the controlling device 102 is determined by the alignment logic 104. For example, the alignment logic 104 may be used to incrementally delay or advance the PPX0 in percentages of the clock period.

In an embodiment, the controlling device 102 uses the alignment logic 104 to delay or advance the PPX0 in percentages of the clock period until signal alignment is achieved. As shown in FIG. 1B, alignment is achieved by the communication system 100 since the time difference between the leading edge of the PPX0 and the leading edge of the FBCK is less than or equal to tALGN, and the leading edge of the PPX0 is within the pulse duration of the internal FB0. Stated a different way, the internal FB0 operates to gate the leading edge of PPX0 when sampling the FBCK. As described above, the device X uses the alignment logic 104 to compensate for the inherent system latency by adding a latency of 2-clock periods to the received FB0 (resulting in the internal FB0). The internal FB0 is used by the alignment logic 104 to establish whether the comparison between the leading edge of the PPX0 and the leading edge of the FBCK occurs within the correct clock cycle. In an embodiment, the device X transmits a point-to-point signal PPX1 over signal propagation path 118 to inform the controlling device 102 that signal alignment is achieved and the other operations may ensue (e.g. writing and/or reading of data, etc.).

Figure 2:
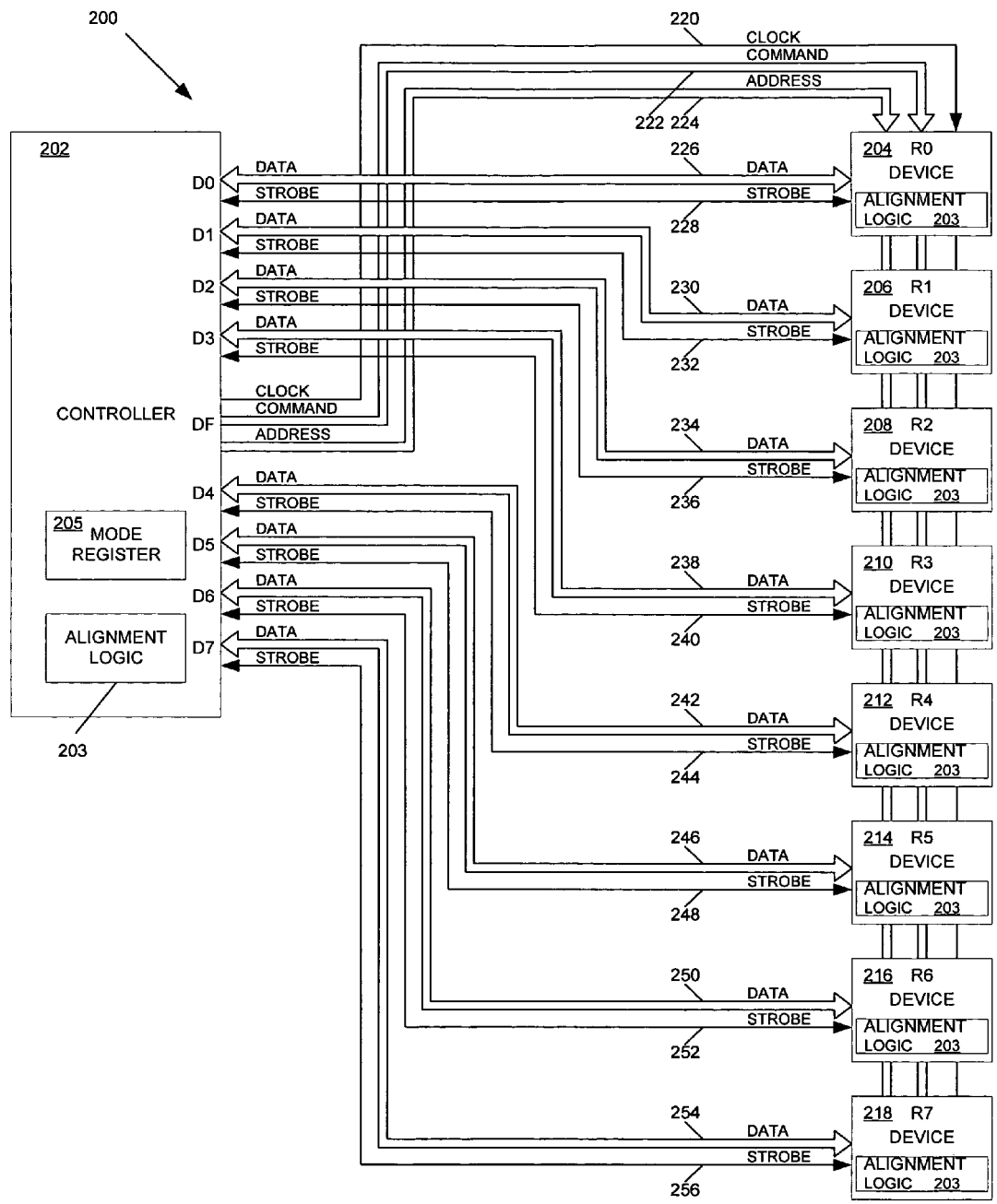
FIG. 2 is a block diagram illustrating components of a communication system, according to an embodiment.

FIG. 2 is a block diagram illustrating components of a communication system 200, according to an embodiment. The communication system includes a controller 202 for controlling aspects of the communication system 200. The controller is in communication with a number of devices 204-218 via a number of signal propagation paths 220-256. While one controller 202 is shown, the communication system 200 may include multiple controllers in communication with devices 204-218 and other devices and systems. In an embodiment, the communication system 200 is a memory system, such as a synchronous dynamic random access memory (SDRAM) system, double-data rate (DDR) synchronous DRAM (DDR SDRAM) system, other DDR system, etc. The communication system 200 can be a stand-alone system or implemented as part of another system, such as a handheld or mobile computing system, a desktop computing system, a laptop computing system, and other systems.

While not shown to scale in FIG. 2, the lengths of the signal propagation paths differ between certain daisy-chained signals 220-224 and the point-to-point signals 226-256. Consequently, the communication system 200 uses alignment logic 203 to account for the different signal propagation times when communicating one or more signals over the various signal propagation paths. Various signal communication topologies may include different signal path lengths and configurations. As discussed above, if the controller 202 were to simultaneously propagate signals across the signal paths 220-256, certain signals may arrive sooner than other signals, while other signals may arrive later than other signals.

According to an embodiment, before communicating information, the communication system 200 uses the alignment logic 203 to align one or more signals by accounting for the different signal path lengths and associated signal propagation times when communicating signals, but is not so limited. As described further below, the alignment logic 203 may operate to adjust one or more communicated signals, so that signals having different propagation times arrive at the one or more devices 204-218 properly aligned and in phase. For example, when initializing the communication system 200, it may be useful to adjust one or more signals, such as one or more data strobe signals, so that one or more signals arrive at the one or more devices 204-218 spaced apart in time within a defined tolerance at a defined time, described below. In certain embodiments, the alignment logic 203 may be stand-alone, or shared between the controller 202 and one or more devices 204-218 or another system.

The controller 202 is in communication with the devices 204-218 via a clock signal path 220, a command signal path 222, and an address signal path 224. The clock signal path 220, command signal path 222, and address signal path 224 are referred to as daisy-chained signal paths, as they traverse through each device along common paths respectively. Based on a desired communication procedure, the controller 202 may operate to communication one or more signals over the signal communication paths 220, 222, and 224. The controller 202 may operate to drive or propagate a clock signal (CK) having a period over the clock signal path 220. The CK may be generated by the controller 202 or externally driven. The controller 202 may operate to drive or propagate a command signal (CMD) over the command signal path 222. The controller 202 may also operate to drive or propagate an address signal (ADD) over the address signal path 224.

With continuing reference to FIG. 2, the controller 202 is in communication with the device 204 via data signal path 226 and data strobe path 228. The controller 202 is in communication with the device 206 via data signal path 230 and data strobe path 232. The controller 202 is in communication with the device 208 via data signal path 234 and data strobe path 236. The controller 202 is in communication with the device 210 via data signal path 238 and data strobe path 240. The controller 202 is in communication with the device 212 via data signal path 242 and data strobe path 244. The controller 202 is in communication with the device 214 via data signal path 246 and data strobe path 248.

The controller 202 is in communication with the device 216 via data signal path 250 and data strobe path 252. The controller 202 is in communication with the device 218 via data signal path 254 and data strobe path 256. Signal paths 226-256 are referred to as "point-to-point" signal paths, respectively. The controller 202 and each respective device 204-218 may operate to drive or propagate data signals over the data signal paths 226, 230, 234, 238, 242, 246, 250, and 254. The controller 202 and each respective device 204-218 may operate to drive or propagate data strobe signals over the data strobe signal paths 228, 232, 236, 240, 244, 248, 252, and 256. The communication system 200 can include greater or fewer number of signal communication paths, controllers, and/or devices.

The description of a signal alignment process between the controller 202 and the device 218 is presented to simplify the discussion of how the communication system 200 uses the alignment logic 203 to achieve signal alignment between the controller 202 and one of more of the devices 204-218. The communication system 200 may implement the alignment logic 203 at a desired time, such as before communicating data or other information. For example, the communication system 200 may use the alignment logic 203 during an initialization procedure to achieve signal alignment between the controller 202 and one or more of the devices 204-218. As described above, the signal alignment logic 203 of the communication system 200 operates to compensate for signal propagation issues before a signal, such as a data strobe signal and/or data, is communicated between the controller 202 and one or more of the devices 204-218.

Figure 2A:
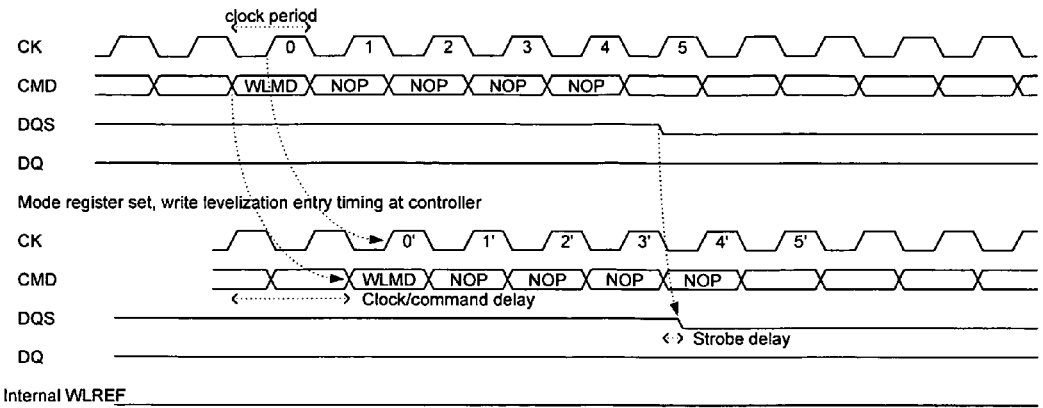
FIGS. 2A-2C are signal timing diagrams which illustrate using signal alignment logic to achieve write alignment, according to an embodiment.
Figure 2B:
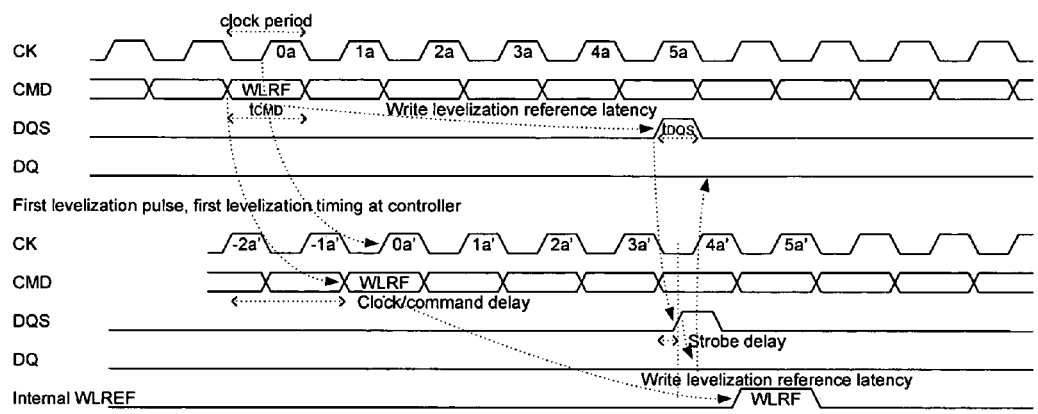
Figure 2C:
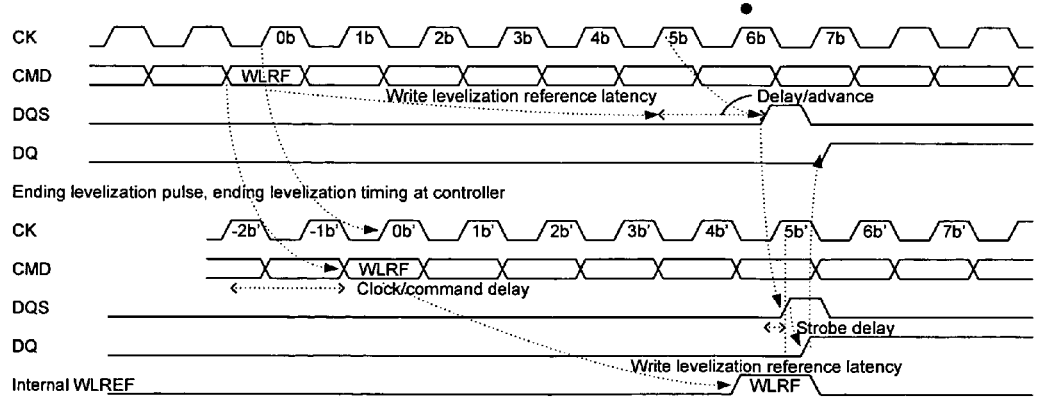

FIGS. 2A-2C are signal timing diagrams which illustrate signals used by the communication system 200 during a write alignment process, according to an embodiment. As shown in FIGS. 2A-2C, during the write alignment process, the controller 202 communicates a clock signal (CK) having a clock period over signal propagation path 220. The controller 202 communicates a command signal (CMD) over signal propagation path 222. The controller 202 communicates a data strobe signal (DQS) to the device 218 over signal propagation path 256. In certain embodiments, the DQS functionality includes both a unidirectional, single-ended read strobe per byte, and a unidirectional, single-ended write strobe per byte, edge-aligned, center-aligned, but is not so limited and other variations exist. The controller 202 may also communicate a data signal (DQ) to the device 218 over signal propagation path 254.

The communication system 200 achieves write alignment based on an alignment protocol or other logic which, when satisfied, informs the controller 202, system, or other device that write alignment is achieved. According to an embodiment, write alignment is achieved when a portion of a DQS (e.g. a leading edge, trailing edge, center, etc.) is aligned, within a defined tolerance, with a portion of the CK (e.g. a leading edge, trailing edge, etc.) and the alignment occurs within the proper clock period as established by the CMD. While a certain number and type of signals are depicted in FIGS. 2A-2C, the communication system 200 and associated alignment process is not so limited. The time references (0a, 1a, etc.) of FIG. 2B, correspond to times subsequent to the times of FIG. 2A (also true for FIG. 2C as compared to FIG. 2B).

Figure 3:
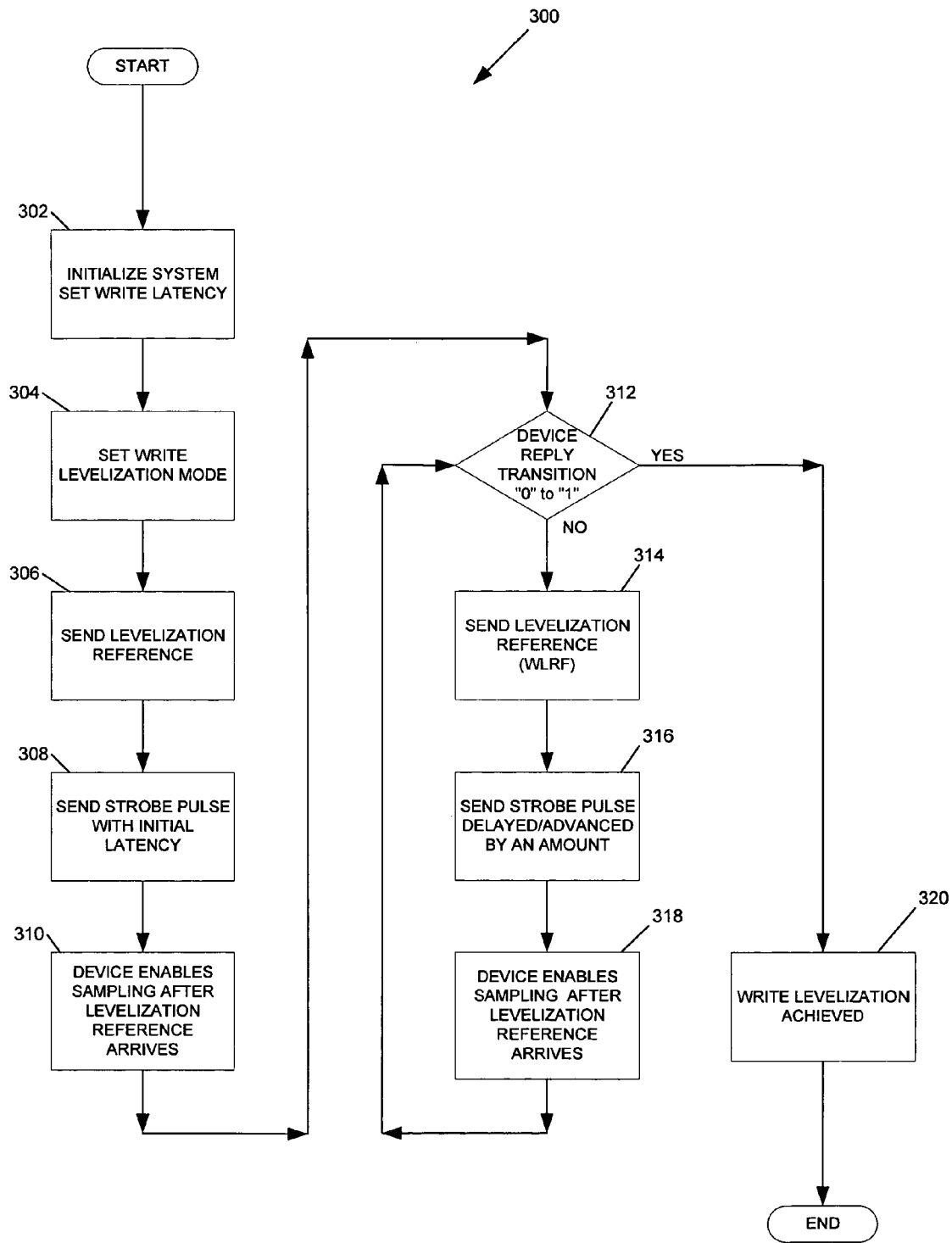
FIG. 3 is a flow diagram which illustrates a write alignment process for aligning signals, according to an embodiment.

FIG. 3 is a flow diagram which illustrates a write alignment process 300 for alignment signals, according to an embodiment. The write alignment process 300 may be used to align signals before performing a write operation to write data to the device 218 for example. FIG. 2 and the signal timing diagrams of FIGS. 2A-2C are referred to in conjunction with the description of the write alignment process 300 with respect to device 218. While the write alignment process 300 is discussed for device 218, the write alignment process 300 may operate to align signal propagation discrepancies between the controller 202 and other devices, such as devices 204-216. The write alignment process 300 may occur periodically, at specific times, randomly, or may depend upon a particular implementation.

At 302, the controller 202 initializes the device 218. During the initialization, the controller 202 informs the device 218 of an amount of latency associated with the communication system 200 in which to account for during the write alignment process 300. For example, a number of bits of the mode register 205 may be encoded to represent a value that corresponds with a latency associated with the communication system 200. Write latency refers to a delay between the communicating of signals, such as the CK and the DQS, which is generally inherent to a particular system. As described above, memory systems generally include an inherent latency in the operation and reaction to commands, clock(s), and/or other signals.

The latency associated with the communication system 200 is determinable and may be based on a number of parameters associated with its operation. For example, the latency of the communication system 200 may be determined by the amount of time it takes for the controller 202 to transmit a DQS after transmitting a CMD. In various embodiments, the communication system 200 may determine a latency of operation before carrying out a write alignment process. In an embodiment, the latency of operation may be provided to or accessed by the communication system 200 by or from another system or device. Moreover, the latency may be taken into account when communicating signals with the communication system 200 and one or more signals may be adjusted to compensate for an amount of latency.

As shown in FIGS. 2A-2C, a write latency of five clock periods is taken into account for certain signals (see the WLRF and DQS) used by the controller 202 and device 218. At 304, the controller 202, by programming the mode register 205 for example, enters the write alignment mode by sending a CMD encoded with a write alignment mode signal (WLMD) to the device 218. FIG. 2A illustrates the delay associated with the device 218 receiving the WLMD and the amount of time it takes for the device 218 to process the WLMD and enter the write alignment mode.

At 306, as shown in FIGS. 2B-2C, the controller 202 sends a CMD signal which is encoded with an alignment reference (WLRF) to the device 218 over signal propagation path 222. According to an embodiment, the WLRF includes a pulse duration (tCMD) that is about the same as a clock period. As described below, the WLRF is used to track the correct clock cycle for determining whether write alignment is achieved. As shown in FIG. 2B, at 308 the controller 202 issues an initial DQS including a five clock latency for example, which attempts to account for any inherent latency of the communication system 200 and/or associated components. The DQS is represented as a signal pulse including a pulse duration (tDQS) that is about half a clock period, according to an embodiment. At 310, the device 218 begins sampling to determine whether a portion of the CK is aligned, within a desired tolerance, with a portion of the DQS.

With continuing reference to FIG. 2B, the device 218 receives the CK, WLRF, and DQS at some later time due to the time that it takes for each signal to propagate from the controller 202 to the device 218 along the respective signal propagation paths 220, 222, and 256. The internal WLRF represents the adjustment of the received WLRF by the device 218 which may account for the latency of the communication system 200 when tracking the correct clock cycle. According to an embodiment, the device 218 (and other devices) receives the CK and WLRF at about the same time due to the substantially similar propagation times of these signals. For example, the signal propagation paths 220 and 222 may be designed to have substantially similar lengths to provide for similar signal propagation times. By substantially matching the propagation times of the CK and WLRF, the communication system 200 is able to determine when proper alignment of a portion of the CK and a portion of the DQS occurs within the correct clock cycle as established by WLRF.

The leading edges of the CK and the DQS are used to simplify describing the write alignment process. As shown in FIG. 2B, at 312, the controller 202 monitors signal propagation path 254 to determine if the device 218 has communicated a DQ based on a comparison of the leading edge of the CK with the leading edge of the DQS. For example, depending on the communication protocol, the device 218 uses the alignment logic 203 to determine if the leading edge of the CK is aligned, within a certain tolerance, with the leading edge of the DQS. In an embodiment, to achieve write alignment, the leading edge of the CK is aligned with the leading edge of the DQS when the difference between the leading edges is within a tolerance equal to about one-quarter (+/− 0.25) of the clock period and the alignment occurs within the pulse duration of the WLRF, which tracks the correct CK cycle (or interval), taking into account any latency associated with the communication system 200. As described above, the WLRF ensures that a proper comparison occurs between the leading edge of the DQS and the leading edge of the correct clock. That is, the device 218 recognizes when to determine whether alignment occurs between leading edges of the DQS and CK when the leading edge of the DQS is within the pulse duration of the WLRF (taking into consideration latency and other delays).

As shown in FIG. 2B, the leading edge of the DQS is not within tolerance with respect to the leading edge of the CK. Additionally, the leading edge of DQS is not within the correct clock cycle as established by the internal WLRF at device 218. Thus, the device 218 does not acknowledge that write alignment is achieved. For example, the device 218 does not return a DQ (an acknowledgement signal) over signal propagation path 254 since the leading edge of the CK is not aligned with the leading edge of the DQS and the leading edge of the DQS is not within the correct clock cycle as established by the internal WLRF. Since the leading edge of DQS is not within the tolerance with respect to the correct clock cycle, the communication system 200 continues using the alignment logic 203 to achieve write alignment.

As shown in FIG. 2C, at 314, the controller 202 sends a CMD encoded with a WLRF at time 0b since the leading edge of the CK was not aligned with the leading edge of the DQS at 312. At 316, the controller 202 sends a DQS delayed or advanced by an amount with respect to a previous DQS communication in an attempt to achieve write alignment. FIG. 2C illustrates a later point in time when the controller 202 sends a subsequent DQS delayed or advanced in time with respect to a prior DQS transmission. The controller 202 may have to adjust and send the DQS a number of times before achieving write alignment for the communication system 200. The delay or advancement of the DQS by the controller 202 is determined by the alignment logic 203. At 318, the device 218 samples to determine whether the leading edge of the CK is aligned with the leading edge of the DQS and if the leading edge of the DQS is within the correct clock (based on the reference to the internal WLRF at device 218).

At 320, write alignment is achieved by the communication system 200 since the difference between the leading edge of the DQS and the leading edge of the CK is less than or equal to the tolerance, and the leading edge of the DQS is within the pulse duration of the internal WLRF. Stated a different way, the internal WLRF operates to gate the leading edge of DQS while sampling the CK and DQS. As described above, the device 218 uses the alignment logic 203 to compensate for the inherent latency by adding a latency of five-clock periods to the received WLRF. The internal WLRF is used by the alignment logic 203 to determine whether the leading edge of the DQS is within the correct clock for comparison purposes. As shown in FIG. 2C, the device 218 transmits a DQ over signal propagation path 254 acknowledging that write alignment is achieved which informs the controller 202 of the same and that the writing of data or other operations may begin. In alternative embodiments, the WLRF may be omitted when the delay between a daisy-chained signal and a point-to-point signal is less than or equal to a clock period.

Embodiments described above may be implemented as functionality programmed into any of a variety of circuitry, including but not limited to programmable logic devices (PLDs), such as field programmable gate arrays (FPGAs), electrically programmable logic and memory devices and standard cell-based devices, as well as application specific integrated circuits (ASICs) and fully custom integrated circuits. Some other possibilities for implementing embodiments include: microcontrollers with memory (such as electronically erasable programmable read only memory (EEPROM)), embedded microprocessors, firmware, software, etc. Furthermore, embodiments may be implemented in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments is not intended to be exhaustive or limited by the disclosure. While specific embodiments of, and examples are described herein for illustrative purposes, various equivalent modifications are possible, as those skilled in the relevant art will recognize. The teachings provided herein can be applied to other systems and methods, and not only for the systems and methods described above. The elements and acts of the various embodiments described above can be combined to provide further embodiments. These and other changes can be made to methods and systems in light of the above detailed description.

In general, in the following claims, the terms used should not be construed to be limited to the specific embodiments disclosed in the specification and the claims, but should be construed to include all systems and methods that operate under the claims. Accordingly, the method and systems are not limited by the disclosure, but instead the scope is to be determined entirely by the claims. While certain aspects are presented below in certain claim forms, the inventors contemplate the various aspects in any number of claim forms. For example, while only one aspect is recited as embodied in machine-readable medium, other aspects may likewise be embodied in machine-readable medium. Accordingly, the inventors reserve the right to add additional claims after filing the application to pursue such additional claim forms for other aspects as well.

What is claimed is:

1. A digital communication method, the method comprising:
   a first component in an electronic system communicating a first signal having first signal characteristics including a period over a first signal path, wherein the first signal includes an associated propagation time over the first signal path, and wherein communicating comprises communicating to a second component in the electronic system;
   the first component communicating a second signal having second signal characteristics including a pulse duration that is less than the period of the first signal over a second signal path, wherein the second signal includes an associated propagation time over the second signal path;
   the first component communicating a third signal having third signal characteristics including a pulse duration over a third signal path, wherein the third signal tracks a cycle of the first signal and includes a propagation time that is about the same as the propagation time of the first signal; and
   the first component adjusting the propagation time of the second signal until a difference between the propagation time of the first signal and the propagation time of the second signal is within a defined tolerance and the difference occurs with a correct cycle of the first signal as established by to the third signal.

2. The method of claim 1, further comprising
   the first component communicating a clock signal over the first communication path, the clock signal including a number of pulses, each pulse having a leading edge portion and trailing edge portion, and
   the second component using the third signal to track a correct cycle of the clock signal.

3. The method of claim 2, further comprising the first component communicating a reference signal having a pulse duration about equal to the period of the clock signal over the third signal path, wherein the propagation times of the clock signal and the reference signal are about the same due to the first and third signal paths having about the same propagation lengths.

4. The method of claim 2, further comprising the first component discontinuing the adjusting of the second signal when a time difference as measured between a portion of the second signal and a portion of the clock signal is less than or equal to a percentage of the clock period, and the time difference occurs with the correct cycle.

5. The method of claim 2, further comprising:
   the first component communicating a data strobe signal over the second communication path accounting for an amount of latency associated with the communication, wherein the data strobe signal including a leading edge portion and a trailing edge portion; and
   the first component achieving signal alignment when a time difference as measured between an edge portion of the data strobe signal and a portion of the clock signal is within a defined tolerance.

6. The method of claim 5, further comprising the first component achieving signal alignment when the time difference as measured between an edge portion of the data strobe signal and an edge portion of the clock signal is within the defined tolerance, and the time difference occurs within the correct cycle as established by the third signal.

7. The method of claim 1, further comprising the second component accounting for an amount of latency associated with a communicated signal.

8. A digital communication system comprising:
   a first communication device configured to:
   communicate a first signal having a period over a first signal path, wherein the first signal includes a first propagation time;
   communicate a second signal having a pulse duration over a second signal path, wherein the second signal includes a second propagation time;
   communicate a third signal having a pulse duration over a third signal path, wherein the third signal tracks a period of the first signal and includes a third propagation time that is about the same as the propagation time of the first signal; and
   adjust the propagation of the second signal until a propagation difference between the first signal and the second signal is within a defined tolerance and the propagation difference corresponds with a correct cycle of the first signal as established by the third signal.

9. The system of claim 8, wherein the first communication device is further configured to communicate a data strobe signal having a leading edge portion and a trailing edge portion over the second signal path, and wherein the first communication device is further configured to account for an amount of latency when communicating one or more signals.

10. The system of claim 9, wherein the first communication device is configured to adjust the data strobe signal in percentages of a clock period until signal alignment is achieved.

11. The system of claim 8, further comprising a second communication device, wherein the second communication device is configured to communicate a fourth signal over a fourth signal path to inform the first communication device that signal alignment is achieved after receiving the first, second, and third signals from the first communication device, wherein the second communication device is configured to account for an amount of latency when communicating one or more signals.

12. The system of claim 11, wherein the second communication device is further configured to communicate the fourth signal after determining that the first signal is aligned with the second signal within a defined tolerance.

13. The system of claim 12, wherein the second communication device is further configured to communicate the fourth signal after determining that the first signal is aligned with the second signal within a defined tolerance, and the alignment occurs within a correct clock cycle.

14. The system of claim 8, wherein the first and second signal paths include substantially similar lengths and the third signal operates as a gating window for determining alignment.

15. The system of claim 8, further comprising a memory system.

16. A communication method comprising:
a first component in an electronic system propagating a clock signal having a period over a first signal path, wherein the clock signal includes an associated propagation time, and wherein propagating comprises a signal to a second component in the electronic system;
the first component propagating a data strobe signal over a second signal path, wherein the data strobe signal includes an associated propagation time;
the first component propagating a reference signal over a third signal path, wherein the reference signal includes an associated propagation time and tracks a correct clock interval; and
the first component adjusting the propagation of the data strobe signal over the second signal path until a portion of the data strobe signal is separated by an amount from a portion of the clock signal and the portion of the data strobe signal is within the correct clock interval as established by the reference signal.

17. The method of claim 16, further comprising the first component communicating the reference signal having a pulse duration about equal to the period of the clock signal over the third signal path, wherein the propagation times of the clock signal and the reference signal are about the same.

18. The method of claim 16, further comprising the first component discontinuing the adjusting of the data strobe signal when a time difference between a portion of the data strobe signal and a portion of the clock signal is within a defined tolerance, and the time difference corresponds with the correct clock cycle taking into account an amount of latency.

19. The method of claim 16, further comprising the second component propagating a fourth signal over a fourth signal path, wherein the fourth signal provides an indication that signal alignment is achieved.

20. The method of claim 16, further comprising the second component accounting for an amount of latency during a write alignment process for signals of a memory system.

* * * * *